United States Patent Office 3,370,457
Patented Feb. 27, 1968

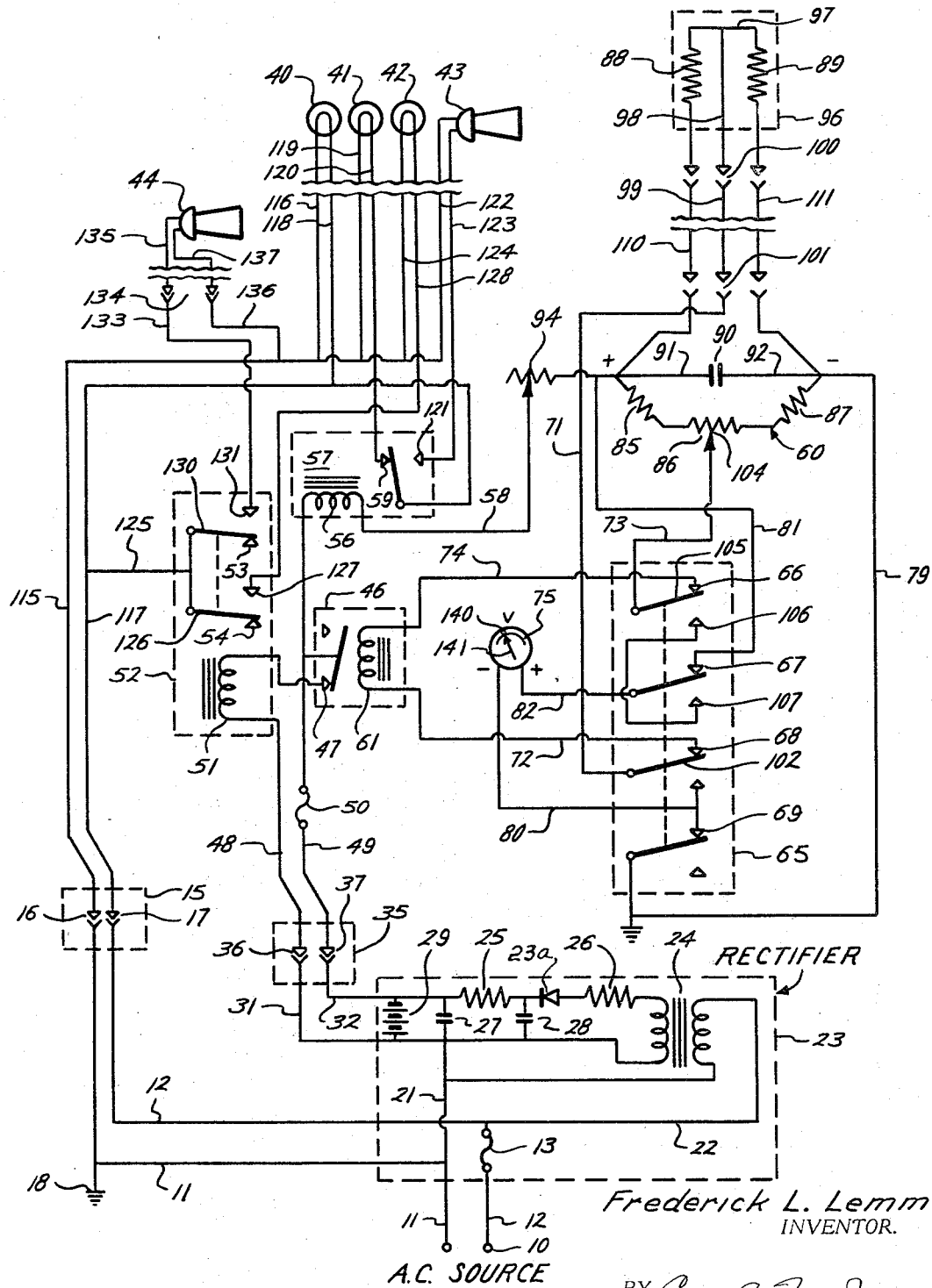

3,370,457
GAS DETECTOR
Frederick L. Lemm, Bellaire, Tex. (% Electronics Research Corporation of America, 5115 Westheimer Road, Houston, Tex. 77027)
Continuation-in-part of application Ser. No. 1,312, Jan. 8, 1960. This application Mar. 4, 1965, Ser. No. 437,116
2 Claims. (Cl. 73—27)

ABSTRACT OF THE DISCLOSURE

The disclosure is of apparatus for detecting the presence of inflammable gas. The apparatus includes, in combination with a platinum resistance wire detection element, a fail-safe electrical circuit so that the apparatus remains in operation in the event of a power failure.

This application is a continuation-in-part of application for Letters Patent Ser. No. 1,312, filed Jan. 8, 1960, and now abandoned.

One object of the invention is to provide gas detecting apparatus which is reliable.

Another object of the invention is to provide such apparatus which is fail-safe, i.e., which will indicate when it is not operating, so that the user can take steps to place the apparatus in operating condition prior to the development of hazardous conditions.

A further object of the invention is to provide such fail-safe gas detecting apparatus which gives both visible and audible notice of the presence of inflammable gases and gas mixtures in a predetermined place, and which also gives both visible and audible notice of non-operational conditions in the apparatus.

Briefly, the apparatus according to the invention includes one or more gas detecting elements placed advantageously to give notice of the development of hazardous conditions where required; a variable bridge circuit, of which the detecting elements form one leg, for circuit regulation or pre-setting under normal non-hazardous conditions; and audible and visible signalling elements for giving notice of hazardous conditions to the operator and for indicating to the operator any failure of the apparatus. The apparatus utilizes sensing or detecting elements of the platinum resistance wire type, which may be of platinum or any other material whose resistance is a function of its thermal capacity within a suitable temperature range.

Other objects and advantages of the invention will appear from the following description of a preferred embodiment of apparatus, reference being made to the accompanying drawing, which is a schematic representation of the apparatus.

Referring now in detail to the drawing, there is shown an alternating current source 10, which may be of any suitable type, and which supplies the power for operation of the apparatus and its circuit. Source 10 has connection through leads 11, 12, source 10 being protected by a fuse 13 in lead 12, with an alternating current terminal block 15, which includes disconnectable connections 16, 17, of any suitable type, for example the plug and socket form indicated. Lead 11 is grounded at 18.

Leads 21, 22, connected to leads 11, 12, respectively, connect source 10 also with the direct current producing elements of rectifier circuit 23. The rectifier circuit may be of any suitable form, and as exemplified in the drawing includes transformer 24, resistances 25, 26, condensers 27, 28, and battery 29, wired, as shown, in conventional form, to a rectifier element 23a of any suitable form. Direct current output is delivered through leads 31, 32, connected to a direct current terminal block 35, which includes disconnectable connections 36, 37, of any suitable type, for example the plug and socket form indicated.

Therefore, from alternating current source 10, alternating current is supplied at terminal block 15 and direct current is supplied at terminal block 35, for energization of alternating current and direct current portions of the apparatus circuit depicted in the remainder of the drawing.

The signalling elements of the apparatus include an alternating current voltage indicator lamp 40, or lamps, which is lighted and bright when the alternating current supply at terminal block 15 is normal, and is unlighted and dark when no alternating current voltage is present at terminal block 15, as in the case of a power failure; a direct current voltage indicator lamp 41, or lamps, which is lighted and bright when the direct current supply at terminal block 35 is normal with battery 29 adequately charged, low direct current voltage or storage battery failure causing lamp 41 to be unlighted and dark; a gas indicator lamp 42, or lamps, which is unlighted and dark when the system is normal and with no inflammable gas present at the monitoring location(s) (to be described), lamp 42 burning brightly when inflammable gas in predetermined concentration is present at the monitoring location(s); one or more control station horns 43, or other audible signal, which is silent when the system is normal and which sounds when the direct current supply furnished at terminal block 35 fails or becomes abnormal; and, one or more horns 44, or other audible signals, placed at strategic locations for signalling the presence of inflammable gas mixtures at the monitoring location(s).

When relay switch 46 is closed at terminal 47, as shown and representing the normal condition, leads 48, 49 from terminal block 35, lead 49 including fuse 50 to protect the direct current source, supply direct current energization of relay coil 51 of dipole relay switch 52 to cause it to be closed at terminals 53, 54 thereof. Relay coil 56 of relay switch 57 is energized through leads 49, 58 to normally closed position at terminal 59 thereof, as shown, when direct current is supplied to the input of bridge 60. Relay coil 61 of relay switch 46 is energized to close the switch at terminal 47, as described earlier, by the output of bridge 60.

Four-pole manual switch 65 is normally closed at terminals 66–69 thereof, as shown. This normal condition of switch 65 causes relay coil 61 to be connected to the output of bridge 60 through leads 71, 72 and 73, 74, and also causes a voltmeter device 75 to be connected to the bridge input through leads 79, 80 and 81, 82.

Bridge 60 is a thermal conductance bridge comprising resistances 85, 86, 87, resistance 86 having variably positioned output lead 73, and resistances 88, 89, resistance 88 being termed the "detecting" resistance element and resistance 89 being termed the "reference" resistance element. A condenser 90 is connected between the input corners of the bridge by wires or leads 91, 92. A variable resistance 94 is connected to the input bridge terminal between resistances 85, 88, and is used to adjust the direct current voltage supplied to the bridge circuit through lead 58. Adjustment of meter 75 to an operating "zero" reading intermediate its scale wherein D-C voltage supplied to the bridge is read, is accomplished by appropriate adjustment at variable resistance 94.

The resistances 88, 89 of bridge 60 form the elements of a detecting element or probe 96. Output point 97, or terminal, of the bridge is connected by conductors 98, 99, 71 and serially interdisposed releasable connections 100, 101, to switch element 102 of manual switch 65, which, in its normally closed position at terminal 68 connects bridge output point 97 to lead 72 and relay coil 61 of relay 46. The other bridge output point at 104 at variable position intermediate resistance 86 is connected through lead 73, switch element 105 normally closed at terminal 66, and lead 74 to the other side of relay coil 61 of relay 46. Terminals 106, 107 of switch 65 are interconnected as shown.

"Detecting" resistance element 88 is a small gauge filament resistor of platinum or other suitable material having the characteristic of increased resistance when contacted by certain gaseous or vaporous substances. The filament material has a resistance which is a function of its thermal capacity within a suitable temperature range. In particular, filament 88 has increased resistance when contacted by inflammable gases such as the lower aliphatic hydrocarbons of high volatility, these including primarily the methane to decane straight and branched chain series, and including such materials as gasolines, LPG's, kerosene, and the like, all of known flammable propensities. Preferably, the detecting resistor is a fine filament of "porous" platinum metal saturable with certain gases or vapors to increase its resistance.

"Reference" resistance element 89 is a resistance comparable to resistance 88 when the latter is in its normal condition unaffected by an inflammable gas or vapor.

Probe 96 is connected to bridge 60, of which it forms a part, by a conductor cable which includes conductors or leads 99, 110, 111, the two latter connecting between resistances 88, 89 and the bridge, as shown. Connection 100 not only connects leads 98, 99, previously described, but also connects the other cable conductor elements. Connector 101 fulfills the same purpose at the other end of the cable. Probe 96 is usually remote from the remainder of the apparatus, at a location where dangerous gas leakage or accumulation is likely to occur, and the connecting cable may be of any suitable length. A plurality of probes 96, and connecting cables, may be provided to different locations requiring monitoring, these being interchangeably connected at connection 101 to obtain a test at any of the locations.

The meter 75 is a voltmeter which, as has been described, is connected to indicate the direct current supplied to the bridge 60 when manual switch 65 is in the normal, not operated, position shown in the drawing. The presence of inflammable gas at a probe element does not affect the reading at meter 75 unless manual switch 65 has been operated to its other position, in which case meter 75 will show the gas concentration at the probe. When switch 65 has been operated, meter 75 is connected to output points 97, 104 of the bridge, and when so connected, will indicate the concentration of inflammable gases, if any, at the probe location.

Lamp 40 receives alternating current power through leads or conductors 115, 116 from terminal block 15 and through leads 117, 118 from the other connection of terminal block 15, to be either brightly illuminated to indicate when the alternating current supply is normal or dark to indicate when the alternating current supply is abnormal or has failed.

Lamp 41 receives alternating current power through leads or conductors 115, 119 from terminal block 15 and through lead 117, relay switch 57 closed at terminal 59, and lead 120, to be brightly illuminated to indicate when the direct current portions of the circuit are operative whereby relay switch is held closed as described, and to be dark to indicate when direct current power has failed in which case relay coil 56 would be de-energized so that the switch would open at terminal 59 and close at its other terminal 121.

This condition would cause sounding of horn 43, which receives alternating current power through leads 115, 122 and through lead 117, switch 57, and lead 123 when the direct current power has failed and the alternating power source is still in operation.

Lamp 42, the gas indicator lamp, normally dark, receives alternating current power through leads 115, 124 and through leads 117, 125, relay switch 52 elements 126, 127 and lead 128, to be brightly illuminated to give warning of an inflammable gas accumulation at the probe location when relay switch 52 has been caused to move from its normal position, shown in the drawing, to be other position of the switch. This movement of switch 52 is caused when power to relay coil 51 is cut off by opening of switch 46, which in turn is caused by energization of relay coil 61 through lead or conductor 74, elements 66, 105 of switch 65, and lead 73, and through lead or conductor 72, elements 68, 102, of switch 65, and leads 71, 99, 98, due to unbalance of the bridge 60 circuit caused by a change in resistance of detector resistance element 88.

The detector resistance element 88 may, as has been described, be made of platinum. The platinum as used in these filaments is porous. The porosities and performance of such filaments whether of platinum or of other materials are described in Scientific Paper of the Bureau of Standards, No. 334, dated June 23, 1919, particularly at Section 2, "Investigation of Principles Involved," page 47 ff.

Combustible gases and oxygen enter the pores of the filament and upon absorption at the filament surfaces are burned by the heat of the filament to raise the temperature of the filament and thereby alter its resistance When detector resistance element 88 is affected by an inflammable gas or gas mixture in contact therewith, its resistance increases proportional to the inflammable gas concentration and therefore also in proportion to the explosiveness of the gas, so that the bridge unbalance registers an indication of the explosiveness at meter 75.

Of course, the bridge is susceptible to unbalance according to the usual equation:

$$R88 = \frac{R85}{R87} \times R89$$

where R88, R85, R87 and R89 are the resistances of the respective resistance elements 88, 85, 87, 89. The above equation omits the partial resistances of resistance element 86 which are additive to R85, R87 depending on the position of point 104, movements of point 104 being used to balance meter 75 to a "zero" position away from its zero voltage position.

Audible signal or signals 44, which may be at any pre-selected location(s), remote or otherwise, are supplied with alternating current energy through leads 117, 125, elements 130, 131, of relay switch 52, lead 133, releasable connector 134, and lead 135, and through leads 115, 136, connector 134, and lead 137 when relay switch 52 is moved from its shown normal position, as heretofore already described, to sound at said pre-selected location(s) to give warning of the presence of inflammable gas at the location of a probe 96 connected to the bridge circuit.

A variety of signals or warnings are given to the operator by the fail-safe gas indicator apparatus heretofore described, to indicate deficiencies of the apparatus and/or detection of an inflammable gas:

(1) Failure of alternating current supply is indicated by failure of lamp 40 to be illuminated.

(2) Failure of direct current supply to the bridge is indicated by failure of lamp 41 to be illuminated and by sounding of audible signal 43.

(3) Presence of inflammable gas at a probe location is indicated by lighting of lamp 42 and by sounding of audible signal(s) 44.

Also, when switch 65 is manually operated from its normal position shown to close at its other terminals, (4) If the apparatus is in normal condition and inflammable gas is at the monitoring locations, those conditions are indicated by:

(a) Lighting of lamp 42;
(b) No sounding of signal 43; and
(c) The reading on meter 75.

In order that meter 75 may serve in checking the system, as well as for indicating the presence of inflammable gas and its amount, meter 75 has a "zero" mark 140 (which is the operating or "run" pointer position) spaced to the right of the left hand end of its scale. The pointer 141 normally points to the "zero" mark. Since the meter is normally connected across the bridge input terminals, the "zero" reading is a direct measurement of the direct current voltage supplied to the bridge. Adjustment of the meter to the "zero" mark may be made by adjusting variable resistances 94 wherein the meter is referenced for reading voltage supplied to the bridge and 86 wherein, on the switch 65 being operated, the meter is referenced for reading voltage across the output points of the bridge and thus serves as a gas indictor. Movement of the pointer right of "zero" when switch 65 is not operated indicates failure of D.C. voltage at the bridge. No direct current voltage is read at the midposition of the meter scale.

When detector element 88 is of increased resistance because of contact of an inflammable gas therewith, meter 75 shows no indication until after manual switch 65 is operated, whereafter movement of the pointer to the right indicates inflammable gas capable of affecting resistance 88. The affect on the resistance of element 88 being proportional to the inflammable gas concentration, the distance of rightward movement of the pointer gives an indication of the concentration, and righthand needle movement indicates that the concentration is increasing while lefthand needle movement indicates that the concentration is decreasing. Thus, meter 75 gives information making it possible not only to detect inflammable gases in any concentration, but also to survey concentrations in locations where presence of gas in some concentration is unavoidable, but is dangerous only in certain concentrations which may be read at meter 75 and thereby made susceptible to control.

It will be apparent that certain elements of the apparatus which have been described may be replaced by other elements having the same function. For example, relay switch 46 may be the electromechanical solenoid-lever type shown, but may be replaced by a functionally equivalent vacuum tube, gas tube, or semi-conductor device, an inductive circuit device using a charge in the relative strength of an electro-magnetic field, an electric circuit arranged to react to a change in the charge of a varying electric field, and the like, all of which will be apparent to the skilled practitioner and require no further explanation here.

While a preferred embodiment of the invention has been shown and described, many modifications thereto may be made by a person skilled in the art without departing from the spirit of the invention, and it is intended to protect by Letters Patent all forms of the invention falling within the scope of the following claims.

I claim:
1. In a fail-safe gas detection apparatus the combination of first D-C activatable electrical circuit means to determine the presence of gas, and second A-C activatable electrical circuit means to provide notification of both the presence of gas and of the failure of the first or second electrical circuitry; said second circuit means including a source of alternating electric current connected to said second circuit means; rectifier means connecting said first and second circuit means whereby said first circuit means is supplied with direct electric current; said first electrical circuit means including a first metal filament responsive to the presence of gas, a second metal filament not responsive to gas, said second filament being electrically connected to said first filament, bridge means for ascertaining the presence of gas by reason of the electrical imbalancing thereof, said bridge means being releasably connected to said first and second metal filaments, volt meter means for both indicating the relative concentration of gas in the vicinity of said first metal filament and for indicating the amount of direct current applied to said bridge means, multi-pole switch means electrically connected to both said bridge means and to said volt meter means, said multi-pole switch means having a first operative position for allowing said volt meter means to indicate the current supplied to said bridge means and a second operative position to allow said volt meter means to indicate the presence of gas in the vicinity of said first metal filament, said second electrical circuit means including first signal means actuated by switch means responsive to changes in bridge output current to indicate the presence of gas in the vicinity of said first metal filament, and including second signal means actuated by switch means responsive to the absence of direct current supplied to said first electrical circuit means to indicate such absence, and including third signal means for indicating the absence of alternating current supplied to said second electrical circuit means.

2. The combination of claim 1, said signal means comprising audible and visual signal means, said first and second metal filaments comprising platinum filaments.

References Cited

UNITED STATES PATENTS

| | | | |
|---|---|---|---|
| 1,971,038 | 8/1934 | Hamilton | 23—255 |
| 2,236,891 | 4/1941 | Bridges | 340—233 |
| 2,302,061 | 11/1942 | Schirm | 340—233 |
| 2,533,339 | 12/1950 | Willenborg | 73—23 |

RICHARD C. QUEISSER, *Primary Examiner.*

JAMES GILL, *Examiner.*

C. IRVIN McCLELLAND, *Assistant Examiner.*